Patented Oct. 17, 1922.

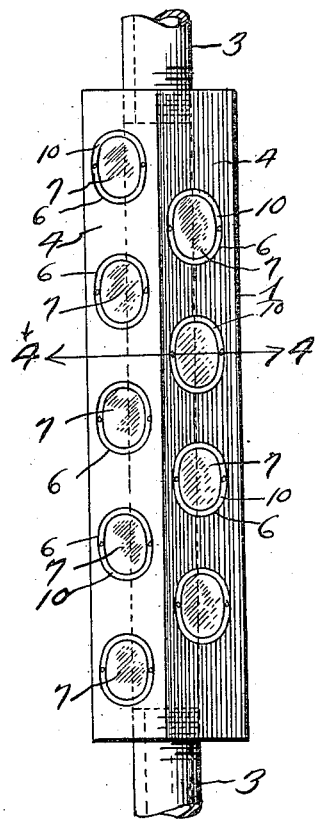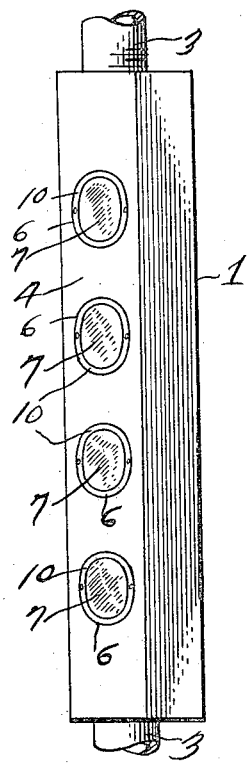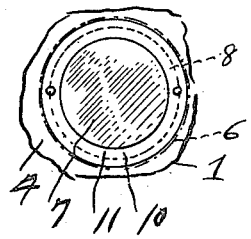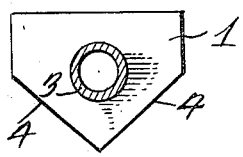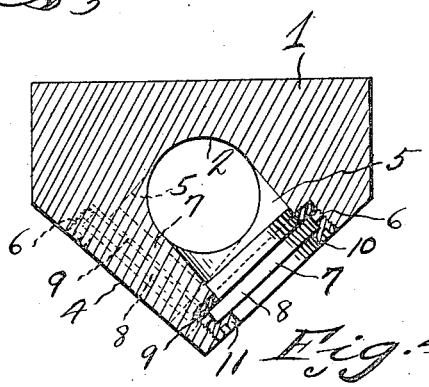

1,432,024

UNITED STATES PATENT OFFICE.

FRANK L. HOMAN, OF OMAHA, NEBRASKA.

WATER GAUGE.

Application filed November 28, 1919. Serial No. 341,054.

*To all whom it may concern:*

Be it known that FRANK L. HOMAN, a citizen of the United States, residing at Omaha, in the county of Douglas and State of Nebraska, has invented certain new and useful Improvements in Water Gauges, of which the following is a specification, reference being had therein to the accompanying drawing.

The invention relates to gauges and has for its object to provide a gauge which is provided with angularly disposed faces having sight openings therein, which are covered by flat glasses, thereby making it easy to observe the level of the water within the gauge for the reason that a flat glass does not reflect shadows.

A further object is to provide a water gauge, having two reading surfaces for indicating the amount of water, the surfaces being at substantially right angles to each other, and the gauge as a whole being particularly adapted for use on locomotives, where the engineer and the fireman occupy positions on opposite sides of the engine cab. Therefore, they will be able to easily read the water gauge from said opposite sides of the cab.

With the above and other objects in view, the invention resides in the combination and arrangement of parts as hereinafter set forth, shown in the drawings described and claimed, it being understood that changes in the precise embodiment of the invention may be made within the scope of what is claimed, without departing from the spirit of the invention.

In the drawings:—

Figure 1 is a front elevation of the water gauge.

Figure 2 is a side view of the gauge.

Figure 3 is a top plan view of the gauge.

Figure 4 is an enlarged detail sectional view taken on line 4—4 of Figure 1.

Figure 5 is an enlarged detail view of one of the sight openings.

Referring to the drawings the numeral 1 designates the body member of the gauge and 2 a round chamber therein. Threaded into the upper and lower ends of the chamber 2 are pipes 3, which supply water to the gauge when the same is on a boiler, the upper pipe 3 preventing the water from becoming air bound, therefore it allows the water to rise in the chamber 2.

The angular faces 4 of the member 1 are provided with a series of apertures 5, which are in communication with the chamber 2, said apertures being provided with threaded counterbores 6. In each aperture 5 and its counterbore is disposed a lens 7, said lenses being provided with centrally arranged annular flanges 8, which are forced into engagement with the bottoms of the counterbores 6 and against the gasket 9 so as to form a water tight joint, by the threaded ring 10, which ring is provided with a flange 11 which overlies and engages the outer face of the flange 8 of the lens. It will be seen that when the ring 10 is screwed into the threaded counter-bore that the lens will be forced into close engagement with the gasket, thereby making a watertight joint. Rings 10 are provided with diametrically opposed apertures for the reception of a spanner wrench when it is desired to place them in position or remove them from the counterbores.

From the above it will be seen that a water gauge is provided, which is simple in construction and one wherein the gauge may be easily read from both sides of the cab of a locomotive. It will also be seen that the objections as to shadows, common in the tubular gauge glasses now in use are obviated. The main trouble being in tubular gauge glasses is that shadows on their convex surface make it impossible to read the liquid level, except from certain angles. The lenses 4 being flat this trouble is overcome.

The invention having been set forth, what is claimed as new and useful is:—

A water gauge having right angular faces and a chamber therein, each of said faces being provided with threaded depressions of greater diameter than the diameter of the chamber and in communication with the chamber through a passage of equal diameter as the chamber, thereby forming a shoulder annular in shape, a washer disposed on said annular shoulder, a lens disposed in the threaded depression, the inner end of said lens being disposed in a passage of communication between the threaded depression and the chamber of the gauge and of substantially the same diameter, said lens being provided with an annular flange spaced from its ends and disposed within the threaded depression and of less diameter than the diameter of the threaded depression, an annular retaining ring L-shaped in cross section, thereby forming two flanges at right angles to each other, said ring being threaded in the threaded depression, said retaining ring having one of its flanges overlying the outer face of the annular flange of the lens and the other annular flange engaging the periphery of the flange of the lens, said last named flange forming means for supporting and guiding the inner end of the lens into the passage between the threaded depression and the chamber, and forming means for forcing the lens flange into engagement with the washer.

In testimony whereof I hereunto affix my signature.

FRANK L. HOMAN.